United States Patent [19]

Irvine et al.

[11] 4,110,038
[45] Aug. 29, 1978

[54] DOCUMENT FEEDER FOR A COPIER

[75] Inventors: Robert Irvine, Riverside; Harry E. Luperti, Wilton; Robert E. Manna, Newtown, all of Conn.

[73] Assignee: Pitney-Bowes, Inc., Stamford, Conn.

[21] Appl. No.: 805,801

[22] Filed: Jun. 13, 1977

[51] Int. Cl.² .................. G03B 27/48; G03B 27/50
[52] U.S. Cl. ................................ 355/50; 271/3; 271/265; 355/8
[58] Field of Search ............... 355/8, 11, 50, 51, 65, 355/66; 271/3, 4, 246, 265

[56] References Cited

U.S. PATENT DOCUMENTS

| | | | |
|---|---|---|---|
| 3,370,844 | 2/1968 | Roberts | 271/265 X |
| 3,747,918 | 7/1973 | Margulis et al. | 271/4 |
| 4,023,791 | 5/1977 | Hori et al. | 271/4 X |

*Primary Examiner*—Richard A. Wintercorn
*Attorney, Agent, or Firm*—Donald P. Walker; William D. Soltow, Jr.; Albert W. Scribner

[57] ABSTRACT

For use with a copier of the type which includes a document illuminating station, a platen at the illuminating station and instrumentalities for flash illuminating respective documents at the illuminating station, there is provided a document feeder which includes a plurality of document feeding instrumentalities. A first feeding instrumentality is provided for feeding respective documents to the platen, a second feeding instrumentality is provided for feeding documents from the platen, and a third feeding instrumentality is provided for feeding documents both to and from the platen. Apparatus is provided for moving the third feeding instrumentality out of document feeding engagement with respective documents fed to the platen to permit such documents to settle on the platen prior to illumination. In addition, apparatus is provided for holding documents fed to the platen in document feeding relationship with respect to the second feeding instrumentality to, for example, prevent movement of the respective documents out of such feeding relationship while settling on the platen.

11 Claims, 5 Drawing Figures

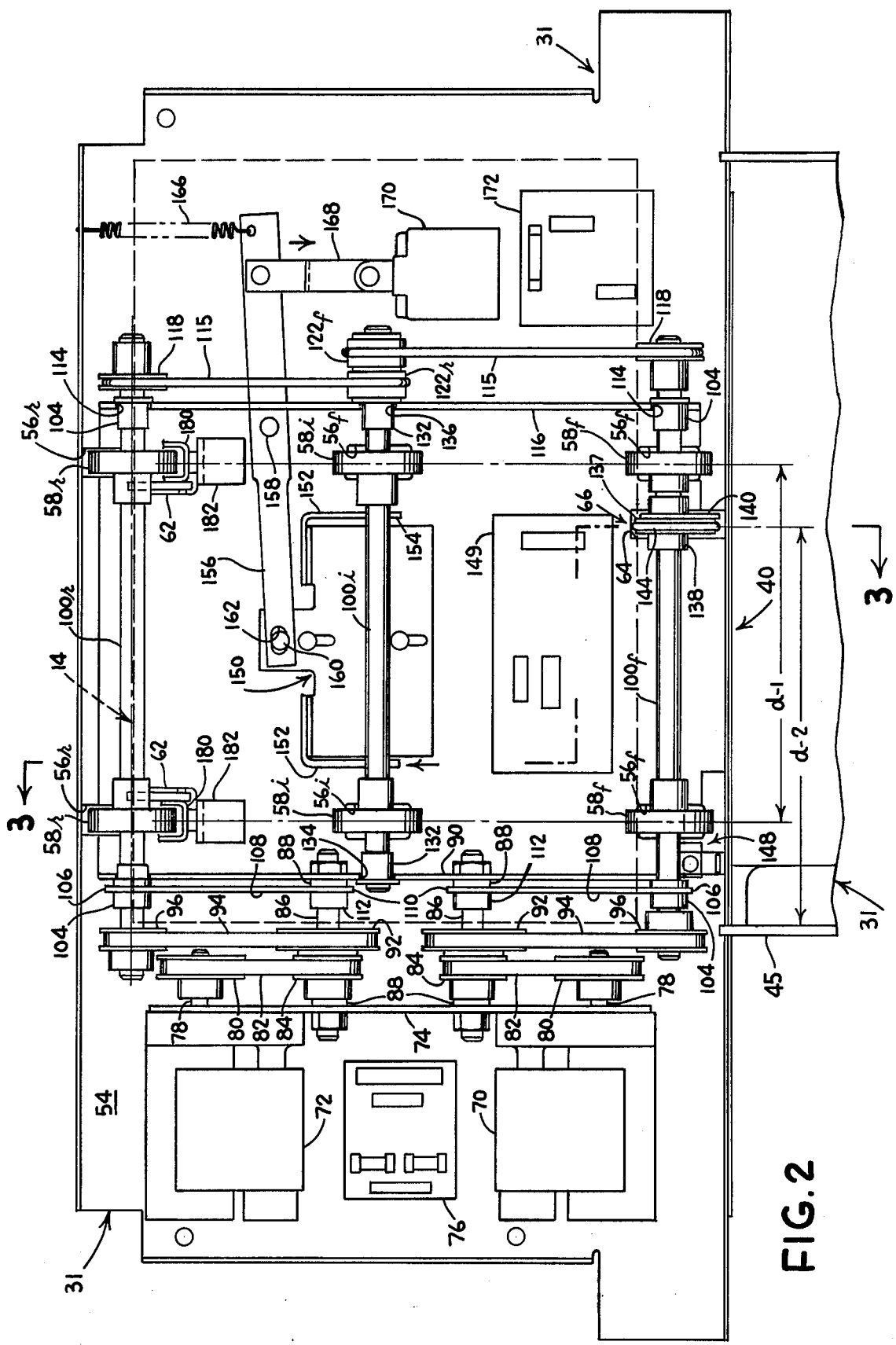

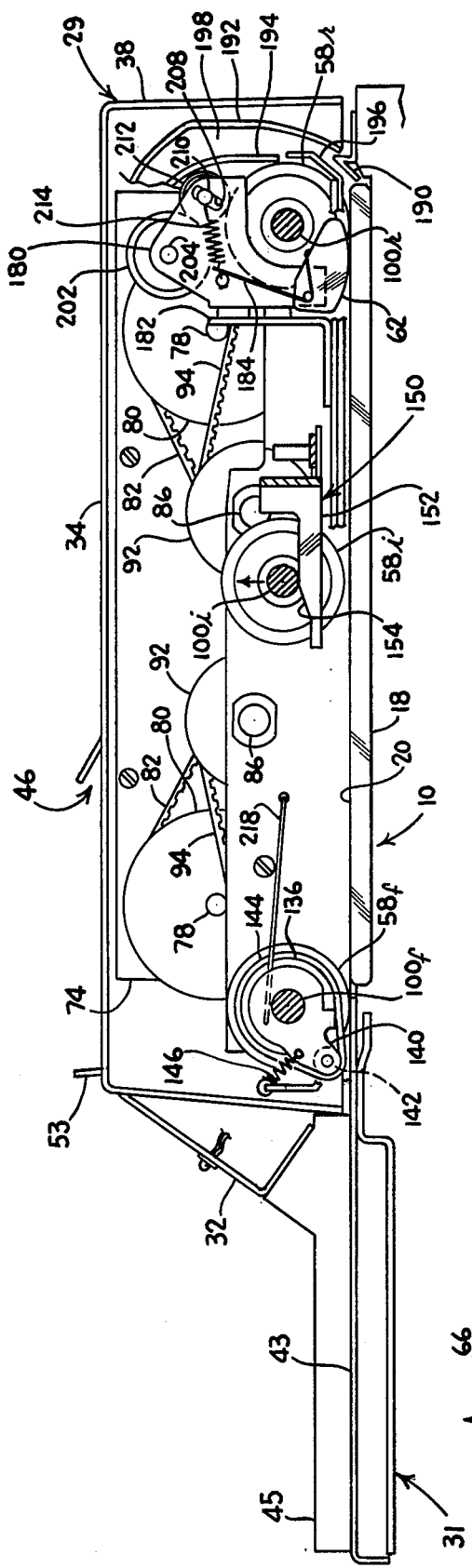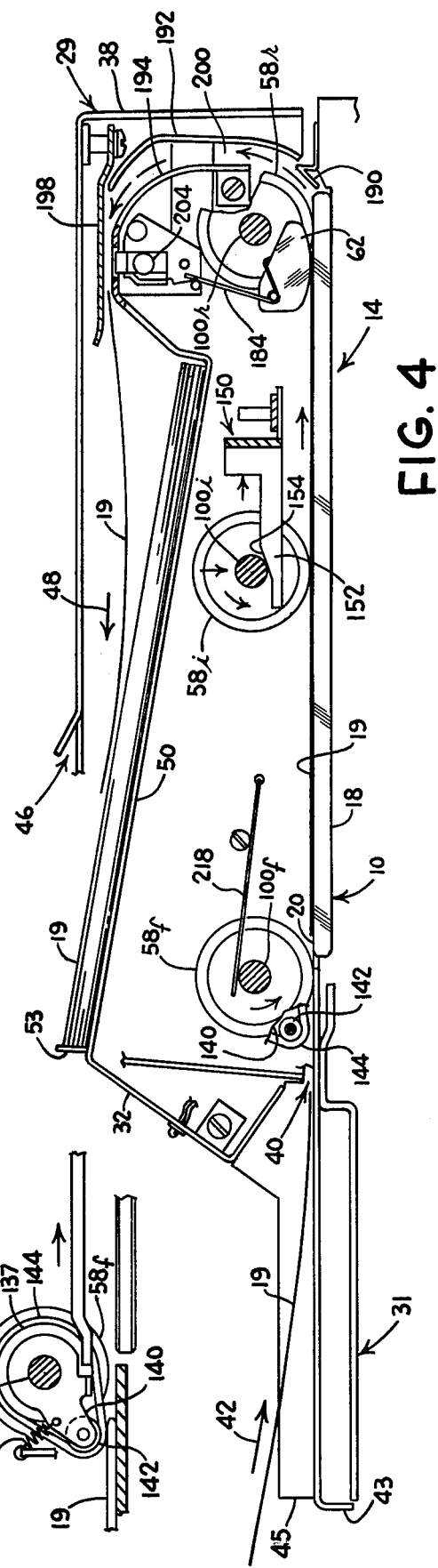

DOCUMENT FEEDER FOR A COPIER

BACKGROUND OF THE INVENTION

Commercially available electrostatic copying machines, or copiers, generally include processing apparatus for forming and developing an electrostatic latent image on a moving photoreceptor and thereafter transferring the developed image from the photoreceptor to a copy sheet made of suitable material such as paper.

As shown in U.S. Pat. No. 3,998,542, issued Dec. 21, 1976 to John A. Toto et al, many of such copiers are provided with well-known means for flash illuminating a document, placed by the operator at the copier's document illuminating station, typically a glass platen, to expose the photoreceptor with light modulated by the graphic information on the document. Whereupon, the photoreceptor selectively conducts to form the electrostatic latent image on the photoreceptor. The light sensitivity of the photoreceptor and intensity of the light utilized for flash illumination purposes are such that the time period required for photoreceptor imaging purposes is on the order of 10 milliseconds or less. It is therefore desirable to equip the copier with a document feeder to permit the operator to take advantage of the rapidity with which copies can be made by avoiding the time-consuming task of carefully locating successive documents at the illuminating station.

One of the long standing problems in the prior art resides in the provision of a simply constructed document feeder which is sufficiently adaptable to reliably handle various documents made of different materials that are of different thickness and diversely calendered. For example, in the course of daily usage of a copier equipped with a document feeder, the feeder may be called upon to handle documents made of plain bond paper, tissue paper or plastic, or the like, of various thicknesses, without folding, creasing, crumpling, or otherwise mutilating, the documents. Accordingly:

An object of the present invention is to provide a simply constructed document feeder for a copier of the type which utilizes flash illuminating means for making copies of a document; and Another object is to provide such a document feeder for reliably feeding documents of different thickness which are respectively differently calendered.

SUMMARY OF THE INVENTION

For use with a copier of the type which includes a document illuminating station, a platen at the illuminating station and means for flash illuminating respective documents at the illuminating station, there is provided a document feeder which includes a plurality of document feeding means. First feeding means are provided for feeding respective documents to the platen, second feeding means are provided for feeding documents from the platen, and third feeding means are provided for feeding documents both to and from the platen. In addition, means are provided for moving the third feeding means out of document feeding engagement with respective documents fed to the platen to permit such documents to settle on the platen prior to illumination. Further, brake means are provided for holding documents fed to the platen in document feeding relationship with respect to the second feeding means to, for example, prevent movement of the respective documents out of such feeding relationship while settling on the platen.

BRIEF DESCRIPTION OF THE DRAWINGS

As shown in the drawings, wherein like reference numerals designate like or corresponding parts throughout the several figures:

FIG. 2 is an enlarged top plan view of the document feeder of FIG. 1 with the cover thereof removed;

FIG. 3 is a sectional view of the document feeder of FIG. 2, with the cover partially removed, taken substantially along the line 3—3 of FIG. 2;

FIG. 4 is a side view of the document feeder of FIG. 2 with the cover partially removed; and FIG. 5 is a detail of a portion of FIGS. 3 and 4.

DESCRIPTION OF THE PREFERRED EMBODIMENT

Figure 1:
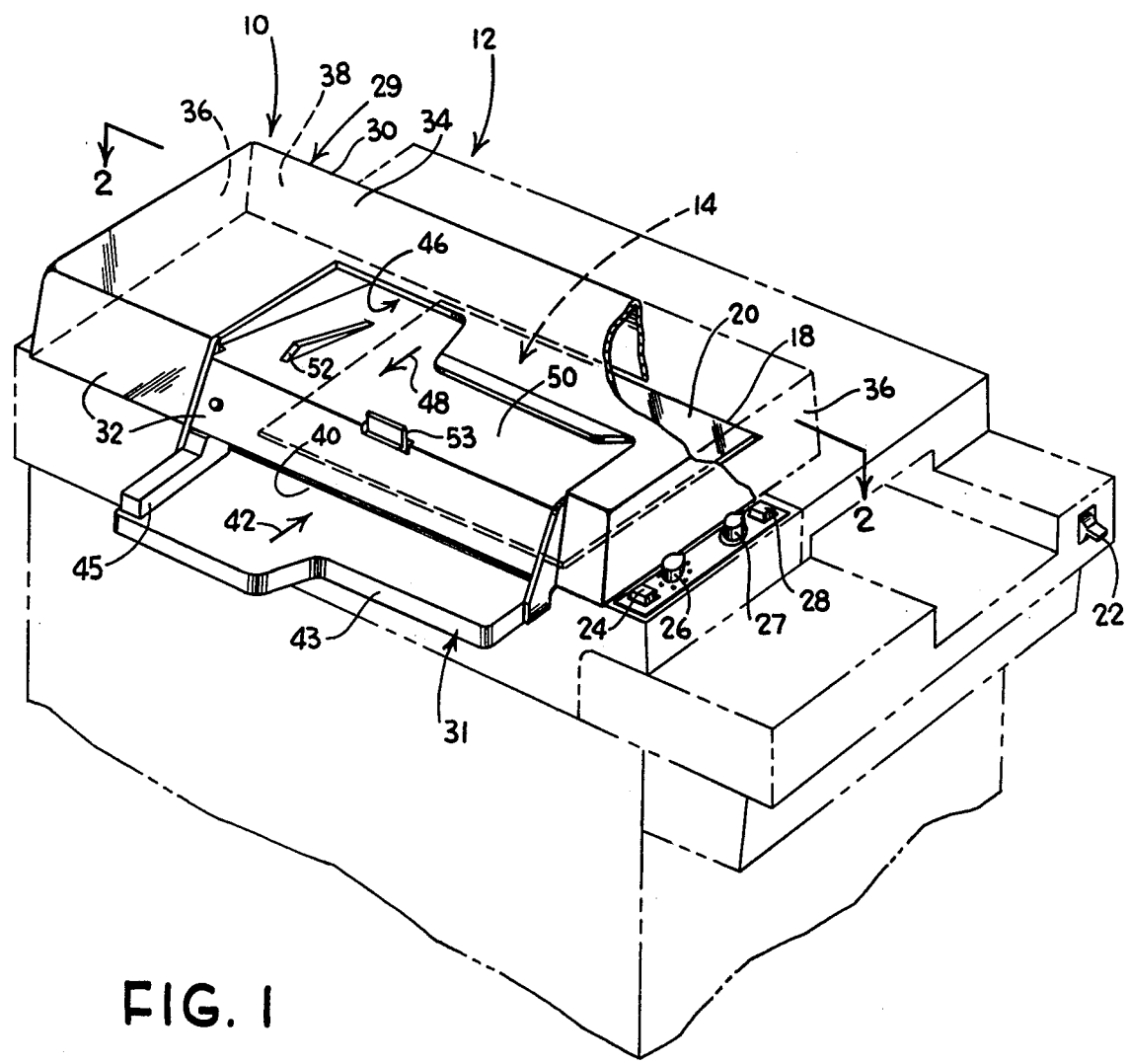
FIG. 1 is a fragmentary perspective view of a copier including a document feeder according to the invention.

As shown in FIG. 1, a document feeder 10, in accordance with the present invention, is suitably removably mounted on a copier 12, over the document illuminating station 14. The copier 12 comprises suitable structure for supporting the various processing means of the copier 12 including a glass platen 18 (FIG. 3) on which an operator ordinarily places a document 19 (FIG. 4) having graphic information to be copied. The upper surface 20 of the platen 18 generally defines the illuminating station of the copier 12.

The processing means includes such instrumentalities as a suitable photoreceptor (not shown) and suitable electro-optical means (not shown) for flash illuminating the document 19 (FIG. 4) at the illuminating station 14 to expose the photoreceptor with the graphic information to be copied. In addition, the processing means comprises suitable well-known means for controlling the various processing instrumentalities of the copier 12 (FIG. 1), including a main power switch 22 for energizing the copier, a print switch 24 for commencing a copying cycle, a first selector switch 26 for choosing the number of copies to be made, a second selector switch 27 for adjusting the visibility of the image on the copy sheet, and a resettable stop-printing switch 28 of general utility.

The document feeder 10 (FIG. 1) comprises a housing 29 including a cover 30, and a frame 31 on which the cover 30 is removably mounted. The cover 30 includes a front wall 32, top wall 34, opposed side walls 36 and a rear wall 38.

The front wall 32 and frame 31 form a document entry aperture 40 (FIG. 4) into which successive documents 19 are individually inserted by the operator, in the direction of the arrow 42, for feeding to the document illuminating station 14. To facilitate insertion of such documents 19 the frame 31 includes a lower platform 43 extending forwardly of the front wall 32, on which documents may be placed for sliding thereon through the aperture 40. To ensure appropriate alignment of the leading edge of the document 19 with respect to the aperture 40, the frame 31 includes a suitably adjustably fixable, translatable, edge guide 45 against which a side edge of a given document 19 may be urged while being slid through the aperture 40.

The top wall 34 (FIG. 1) has a document exit aperture 46 formed therein, through which successive documents 19 (FIG. 4) from the illuminating station 14 are fed by the feeder 10, in the direction of the arrow 48. In addition, the top wall 34 (FIG. 1) includes a recessed, ramp-like, upper platform 50 to which documents fed through the exit aperture 46 are delivered for retrieval by the operator. To facilitate such retrieval, the upper platform 50 may be provided with an upright, wedge-shaped element 52 which serves to elevate a portion of the leading edge of the respective documents above the platform 50, thereby permitting the operator to insert his/her fingers beneath the documents for grasping the same. An upright stop 53 is preferably provided at the forward end of the platform 50, to arrest forward motion of the documents fed to the platform 50.

As shown in FIG. 2, the frame 31 comprises a bottom wall 54 which preferably includes a material which is white to the photoreceptor when a document at the illuminating station 14 is flash illuminated for copying purposes. The bottom wall 54 has six apertures 56 (FIG. 2) formed therein, to accommodate protrusion through the bottom wall 54 of a like number of document feed rollers 58. The respective apertures 56 and rollers 58 are each additionally designated "$f$", "$i$" or "$r$" to distinguish them as being either the forward, intermediate or rear apertures 56 or feed rollers 58, as the case may be. The rear apertures 56$r$ are respectively slightly larger than the forward and intermediate apertures, 56$f$ and 56$i$, to facilitate additionally accommodating protrusion through the bottom wall 54 of a pair of brake shoes 62, one of which is located adjacent to each of the feed rollers 56$r$ for holding the leading edge of a document 19 (FIG. 4) fed to the illuminating station 14 in document feeding engagement with respect to the rear feed rollers 58$r$ for feeding thereby after flash illumination. The respective intermediate and rear apertures, 56$i$ and 56$r$ (FIG. 2), are partially located within the illuminating station 14; whereas the forward apertures 56$f$, and rectangularly-shaped aperture 64 formed in the bottom wall 54 to accommodate the protrusion through the bottom wall 54 of document insertion means 66, are located outside of the illuminating station 14. Apertures 56$r$ and 56$i$ are respectively located in the bottom wall 54, in a position with respect to the glass platen 18, such that any rectangularly-shaped document at the illuminating station 14 which measures at least 5½" along the leading edge and 6" along a side edge, is disposed to completely cover the intermediate apertures 56$i$ and to cover the portions of the rear apertures 56$r$ located in the illuminating station. Accordingly, most documents fed to the illuminating station 14 are entirely located against the white background of the bottom wall 54; as a result of which most copy sheets are devoid of background markings due to internal components of the copier 12 being flash illuminated.

As shown in FIG. 2, the feeder 10 includes a source of supply of motive power comprising first and second motors, respectively designated 70 and 72, which are respectively suitably fixedly attached to a mounting plate 74 which is suitably anchored to the frame 31. The motors, 70 and 72, are each adapted by well-known means to be electrically connected to the copier 12 (FIG. 1) via suitable well-known control means 76 (FIG. 2), for energization and deenergization by the control means 76 when the print switch 24 (FIG. 1) is actuated.

Each of the motors, 70 and 72 (FIG. 2), includes a drive shaft 78, on which there is suitably fixedly mounted a pulley 80 about which an endless timing belt 82 is looped for transmitting rotational movement of the pulley 80 to another pulley 84 which is fixedly attached to an idler shaft 86 for rotation thereof. The opposite ends of each of the idler shafts 86 are respectively supported for rotation by a suitable bearing 88, one of which is fixedly attached to the mounting plate 74, and the other of which is fixedly attached to another mounting plate 90 suitably anchored to the frame 31. An additional pulley 92, fixedly attached to each of the idler shafts 86 for rotation therewith, has another endless timing belt 94 looped thereabout for transmitting rotational movement of the pulley 92 to yet another pulley 96 which is fixedly attached to a drive shaft 100 for rotation thereof. The respective drive shafts 100 are designated "$f$" and "$r$" to distinguish them as being either the forward or rear drive shafts 100$f$ or 100$r$, as the case may be.

The opposite ends of the respective drive shafts, 100$f$ and 100$r$ (FIG. 2), are each supported for rotation by a suitable bearing 104 such that the shafts, 100$f$ and 100$r$, respectively longitudinally extend parallel to each other and to the entry aperture 40, and are vertically movable away from the copier platen 18, by a given document, against suitable spring tension (as hereinafter discussed) tending to urge the respective shafts, 100$f$ aand 100$r$, toward the copier platen 18. To accommodate vertical movement of the respective shafts, 100$f$ and 100$r$, one of the bearings 104 is fixedly attached to the free end 106 of a pivot arm 108. The other end 110 of the pivot arm 108 is fixedly attached to another bearing 112 pivotably mounted on the idler shaft 86. The other bearing 104 is vertically movably mounted in a slot 114 formed in a mounting plate 116 suitably anchored to the frame 31.

The respective forward feed rollers 58$f$ (FIG. 2) are fixedly mounted on the forward drive shaft 100$f$, spaced a predetermined distance "$d-1$" from each other, for rotation with the forward drive shaft 100$f$. In addition, the respective rear feed rollers 58$r$ are fixedly mounted on the rear drive shaft 100$r$, spaced the same distance "$d-1$" from each other, for rotation with the rear drive shaft 100$r$.

A pulley 118 (FIG. 2) is fixedly mounted on the respective drive shafts, 100$f$ and 100$r$, for rotation therewith. Each of the pulleys 118 has a belt 115 looped thereabout for transmitting rotational movement of the pulley 118 to an intermediate roller drive shaft 100$i$ via respective over-running clutches 122, both of which are mounted on one end of the intermediate drive shaft 100$i$. The clutches 122 are respectively additionally designated either "$f$" and "$r$" to distinguish them as being driven from either the forward drive shaft or the rear drive shaft.

The opposite ends of the intermediate drive shaft 100$i$ (FIG. 2) are respectively supported for rotation by a suitable bearing 132 such that the shaft 100$i$ longitudinally extends parallel to the forward and rear drive shafts, 100$f$ and 100$r$, and is vertically movable away from the copier platen 18 against the force of gravity tending to urge the shaft 100$i$ toward the copier platen 18. To accommodate vertical movement of the shaft 100$i$, one of the bearings 132 is mounted for vertical movement in a slot 134 formed in the mounting plate 90, and the other bearing 132 is mounted for vertical movement in a slot 136 formed in the mounting plate 116. The respective intermediate feed rollers 58$i$, are spaced from each other the same distance "$d-1$" as the forward feed rollers 58$f$ are from each other, and fixedly attached to the intermediate drive shaft 100$i$ for rotation therewith.

The clutches, 122$f$ and 122$r$, are operated out of unison with each other, in the sense that when one of the clutches, 122$f$ or 122$r$, is operated, the other clutch, 122$f$ or 122$r$, is not operated. When the motor 70 is energized, to drive the forward drive shaft 100f for rotating the forward feed rollers 58f, clutch 122f over-runs clutch 122r; as a result of which, rotational movement of the forward drive shaft 100f is transmitted to the intermediate drive shaft 100i for rotating the intermediate feed rollers 58i in unison with the forward feed rollers 58f. On the other hand, when the motor 72 is energized, to drive the rear drive shaft 100r for rotating the rear feed rollers 58r, clutch 122r over-runs clutch 100f; as a result of which, rotational movement of the rear drive shaft 100r is transmitted to the intermediate drive shaft 100i for rotation of the intermediate feed roller 58i in unison with the rear feed rollers 58r.

As shown in FIG. 5, to insure insertion of a documents 19 into document feeding relationship with respect to the forward feed rollers 58f, the document insertion means 66 includes an additional pulley 137 which is fixedly mounted on the forward drive shaft 100f, spaced a predetermined distance "d−2" from the document side-edge guide 45 (FIG. 3) for rotation with the forward drive shaft 100f. In addition, as shown in FIGS. 2-4, there is provided a bushing 138 mounted on the drive shaft 100f adjacent to the pulley 137. The bushing 138 has a lever arm 140 (FIG. 3) fixedly attached thereto which extends beyond the outer periphery of the pulley 137 (FIG. 2) so as to position a smaller idler pulley 142, rotatably attached to the arm 140, beneath and in peripheral alignment with the larger pulley 137. For document contacting purposes there is provided an annulus 144 which is preferably an "O" ring made of rubber, a rubber-like material or other material suitable for frictionally engaging docuents. The annulus 144 is endlessly looped about the respective pulleys 137 and 140. A tension spring 146 (FIG. 3) is suitably connected between the free end of the arm 140 and the frame 31 to maintain more tension in the lower straight portion rather than in the upper straight portion of the annulus 144 when the annulus 144 is driven from the larger pulley 137 upon rotation of the forward drive shaft 100f. To commence rotation of the forward drive shaft 58f, suitable photoelectric means 148 (FIG. 2) are provided for detecting the presence of a document 19 (FIG. 5) beneath the annulus 144 and signaling the motor control circuit 76 via a control logic circuit 149 to energize the motor 70. When the forward drive shaft 100f commences rotation, the torque transmitted to the smaller pulley 142, from the pulley 136 by the annulus 144, momentarily lowers the arm 140 against the tension of the spring 146; whereupon the annulus 144 is momentarily disposed in document feeding engagement with respect to the document 19 to feed the same into document feeding engagement with respect to the forward feed rollers 58f. Of course, in the event that an operator manually feeds the documents into feeding engagement with the forward feed rollers 58f, the document insertion means 66 serves to initially feed the documents to the illuminating station 14.

As shown in FIG. 4, the intermediate feed rollers 58i are disposed in document feeding relationship with respect to the platen 18. On the other hand, as shown in FIG. 3, the intermediate rollers 58i are disposed out of document feeding relationship with respect to the platen 18. When a document 19 is being fed by either the forward or rear feed rollers, 58f or 58r, the intermediate feed rollers 58i are disposed in document feeding engagement with respect to the document 19 (FIG. 4), and the appropriate clutch, 122f or 122r, is engaged for driving the intermediate feed roller shaft 100i, and thus the roller 58i, from the forward or rear drive shaft, 100f or 100r, as the case may be. On the other hand, after the document 19 (FIG. 4) is fed to the illuminating station 14 and before illumination of the document 19, the intermediate feed roller shaft 100i is raised to lift the intermediate feed rollers 58i out of document feeding engagement with the document 19, to permit the document 19 to settle on the platen 18 before making copies thereof.

For timely raising and lowering the intermediate rollers 58i, there is provided a shaft engaging member 150 (FIG. 2), slidably connected to the frame 31. The member 150 includes a pair of spaced parallel arms 152 extending beneath the intermediate shaft 100i. Each of the arms 152 (FIGS. 3 and 4) has a ramp-like camming surface 154 adjacent to the intermediate shaft 100i. When the shaft engaging member 150 is moved forwardly, as shown in FIG. 3, the intermediate shaft 100i is cammed upwardly by the arms 152 to raise the rollers 58i out of document feeding engagement with the document 19 fed to the platen 18. When the shaft engaging member 150 is moved rearwardly, as shown in FIG. 4, the intermediate shaft 100i is lowered to dispose the rollers 58i in document feeding engagement with the document 19 fed to the platen 18. To move the shaft engaging member 150 there is provided a rocker arm 156 pivoted to the frame 31 as by means of a pivot shaft 158. One end of the rocker arm 156 is suitably movably connected to the shaft engaging member 150, as by means of a pin 160 extending from the member 150 and into engagement with a slot 162 formed in the rocker arm 156. The other end of the rocker arm 156 is connected to the frame 31, by means of a tension spring 166, and is also pivotably connected to one end of a link 168 which has its other end suitably connected to a solenoid 170. The solenoid 170 is suitably electrically connected to a control circuit 172 which is electrically connected in parallel with the motor driving circuit 76 for operating the solenoid 170 in timed relationship with respect to operation of the respective motors 70 and 72. When operated, the solenoid 170 pulls the link 168 forwardly against the tension of the spring 166 for rotating the rocker arm 156 about the pivot pin 158 to move the shaft engaging member 150 (FIGS. 3 and 4) rearwardly, thereby lowering the intermediate rollers 58i into document feeding engagement with the document 19 on the platen 18.

As shown in FIGS. 2 and 3, the brake shoes 62 are each pivotally attached to a bracket 180 fixedly attached to an L-shaped angle member 182 anchored to the frame 31. Each of the brake shoes 62 is urged, by means of a spring 184 (FIG. 3), to protrude through the rear aperture 56r (FIG. 2), with which it is associated, so as to lightly rest on the platen 18 (FIG. 3) when a document is not disposed thereon. When a document 19 (FIG. 4) is fed to the illuminating station 14, the document 19 slidably engages the respective brake shoes 62 to pivot the brake shoes 62 upwardly against the tension of the spring 184, which in turn urges the brake shoes 62 downwardly to hold the leading edge of the document 19 in document feeding engagement with the rear feed rollers 58r, prior ro raising the intermediate feed rollers 58i out of document feeding engagement with the document 19 on the platen 18. The brake shoes 62 thus serve to maintain a document 19 in proper document feeding engagement with the rear feed rollers 58r after the intermediate feed rollers 58i are raised, even though document settling tends to move the document relative to the rollers 58r, after the intermediate rollers 58i are raised.

To assist the rear rollers 58r in feeding a document 19 (FIG. 4) to the upper platform 50 for retrieval by the operator, the document feeder 10 includes a plurality of guide plates 190, 192, 194, 196 and 198 (FIGS. 3 and 4). The guide plates 190, 192, 194, 196 and 198 define an upwardly and forwardly curvedly-extending channel 200 (FIG. 4) through which documents 19 are fed from the platen 18 to the upper platform 50. The rear feed rollers 58r partially extend into the channel 200 in the vicinity of the guide plates 190 and 196 (FIG. 3) to urge document 19 (FIG. 4) into and through the channel 200.

In addition, for rear roller assistance purposes, there is provided a pair of upper rollers 202 (FIG. 3), one of which is associated with each of the rear rollers 58 and is rotatably mounted on a shaft 204. Each of the upper rollers 202 partially extends into the channel 200 through the guide plate 194 for engaging documents 19 (FIG. 4) fed into the channel 200 by the rear rollers 58r. To promote traction between the documents 19 and upper rollers 202, the guide plate 198 may be, in its entirety, a leaf spring or may include a leaf spring portion extending downwardly and into resilient engagement with the upper rollers 202 for urging documents 19 into engagement with the upper rollers 202. To rotate the upper rollers 202, each of the brackets 180 (FIG. 3) includes a slot 208 in which there is mounted a shaft 210. The shaft 210 has an idler roller 212 mounted thereon. A tension spring 214 is provided, which extends from the shaft 210 and is anchored to the bracket 180, for urging the outer periphery of the idler roller 212 into rolling engagement with the outer peripheries of the associated rear feed roller 58r and upper roller 202 to transmit rotational movement of the rear feed roller 58r to the upper roller 202.

As hereinbefore discussed, the forward and rear drive shafts 100f and 100r are mounted for movement toward and away from the platen 18. The forward drive shaft 100f is resiliently urged, by means of one or more leaf springs 218 (FIG. 3), toward the platen 18; and the rear drive shaft 100r is resiliently urged toward the platen 18 by the tension springs 214. When a document 19 (FIG. 4) inserted into document feeding engagement with the forward, intermediate or rear rollers, 58f, 58i or 58r, as the case may be, the document 19 raises the respective rollers, 58f, 58i or 58r, to accommodate the document 19. The respective springs 218 and 214, urge the forward and rear drive shafts, 100f and 100r, downwardly, to maintain the forward and rear rollers, 58f and 58r, in document feeding engagement with the particular document 19 being fed to and from the platen 18; whereas the force of gravity, acting on the intermediate drive shaft 100i and rollers 58i, maintains the intermediate rollers 58i in document feeding engagement with a document 19 on the platen 18 until the solenoid 170 is operated to raise the intermediate feed rollers 58i for document settling purposes.

In accordance with the objects of the invention there has been described a document feeder for a copier of the type which includes means for flash illuminating documents, wherein the document feeder includes means for reliably feeding documents of different thickness which are respectively calendered.

Inasmuch as certain changes may be made in the above described invention without departing from the spirit and scope of the same, it is intended that all matter contained in the above description or shown in the accompanying drawings shall be interpreted in an illustrative rather than in a limiting sense. And it is intended that the following claims be interpreted to cover all the generic and specific features of the invention herein described.

What is claimed is:

1. A document feeder adapted for use with a copier having a document illuminating station, a platen at the illuminating station and means for flash illuminating respective documents at the illuminating station, the document feeder comprising:
   (a) first document feeding means for feeding respective documents to the illuminating station;
   (b) second document feeding means for feeding respective documents from the illuminating station;
   (c) third document feeding means cooperative with the first and second document feeding means for feeding respective documents to and from the illuminating station, said third document feeding means including means for engaging respective documents for feeding purposes;
   (d) means for holding a portion of each of the respective documents fed to the illuminating station in document feeding relationship with respect to the second document feeding means;
   (e) means for temporarily disengaging the document engagement means from engagement with respective documents fed to the illuminating station prior to illumination of the respective documents, whereby the respective documents fed to the illuminating station settle on the platen prior to illumination thereof; and
   (f) said first document feeding means including a rotatable drive shaft and at least one roller mounted thereon for rotation therewith and in document feeding engagement with respective documents, and said drive shaft mounted for elevation in response to respective documents of different thickness being fed into document feeding engagement with said at least one roller whereby said at least one roller elevates to accommodate respective documents of different thickness.

2. A document feeder adapted for use with a copier having a document illuminating station, a platen at the illuminating station and means for flash illuminating respective documents at the illuminating station, the document feeder comprising:
   (a) first document feeding means for feeding respective documents to the illuminating station;
   (b) second document feeding means for feeding respective documents from the illuminating station;
   (c) third document feeding means cooperative with the first and second document feeding means for feeding respective documents to and from the illuminating station, said third document feeding means including means for engaging respective documents for feeding purposes;
   (d) means for holding a portion of each of the respective documents fed to the illuminating station in document feeding relationship with respect to the second document feeding means;
   (e) means for temporarily disengaging the document engagement means from engagement with respective documents fed to the illuminating station prior to illumination of the respective documents, whereby the respective documents fed to the illuminating station settle on the platen prior to illumination thereof; and (f) said third document feeding means including a rotatable drive shaft, said engaging means including at least one roller mounted on said drive shaft for rotation therewith and in document feeding engagement with respective documents, and said drive shaft mounted for elevation in response to respective documents of different thickness being fed into document feeding engagement with said at least one roller.

3. A document feeder adapted for use with a copier having a document illuminating station, a platen at the illuminating station and means for flash illuminating respective documents at the illuminating station, the document feeder comprising:

(a) first document feeding means for feeding respective documents to the illuminating station;

(b) second document feeding means for feeding respective documents from the illuminating station;

(c) third document feeding means cooperative with the first and second document feeding means for feeding respective documents to and from the illuminating station, said third document feeding means including means for engaging respective documents for feeding purposes;

(d) means for holding a portion of each of the respective documents fed to the illuminating station in document feeding relationship with respect to the second document feeding means;

(e) means for temporarily disengaging the document engagement means from engagement with respective documents fed to the illuminating station prior to illumination of the respective documents, whereby the respective documents fed to the illuminating station settle on the platen prior to illumination thereof; and (f) said holding means including at least one brake shoe mounted for movement in response to insertion of respective documents of different thickness being fed into sliding engagement therewith.

4. The document feeder according to claim 1, wherein said first document feeding means includes means responsive to insertion of respective documents of different thickness into the document feeder, said responsive means including means for feeding respective documents into document feeding engagement with said at least one roller.

5. The document feeder according to claim 1, wherein said first feeding means includes a first pulley fixedly mounted on said drive shaft for rotation therewith, a bushing movably mounted on the drive shaft and having an arm extending therefrom, said arm having a second pulley rotatably attached thereto and disposed beneath and in peripheral alignment with said first pulley, a document engageable annulus looped about said first and second pulleys, and tension spring means connected to the arm for urging the arm upwardly, whereby rotation of said drive shaft causes said annulus to temporarily pivot the arm downwardly resulting in said annulus engaging and feeding respective documents disposed therebeneath into document feeding engagement with said at least one roller.

6. The document feeder according to claim 2, wherein said disengaging means includes means for temporarily raising said drive shaft and thus said at least one roller to permit respective documents fed to the platen to settle thereon prior to illumination.

7. A document feeder for a copier having a document illuminating station, a platen at the illuminating station and means for flash illuminating a document at the illuminating station for document copying purposes, the document feeder comprising:

(a) first document feeding means adapted to accommodate respective documents of different thickness, said first feeding means including first means movable in engagement with the respective documents of different thickness for feeding respective documents to the platen;

(b) second document feeding means adapted to accommodate respective documents of different thickness, said second feeding means including second means movable in engagement with the respective documents of different thickness for feeding respective documents from the platen;

(c) third document feeding means including means adapted to accommodate respective documents of different thickness, said third document feeding means including third means movable in engagement with the respective documents of different thickness for feeding respective documents to and from the illuminating station;

(d) means for holding respective documents of different thickness fed to the platen in document feeding engagement with said second movable means; and (e) means for elevating said third movable means out of engagement with the respective documents prior to illumination thereof to permit the respective documents to settle on the platen prior to illumination thereof.

8. The document feeder according to claim 7, wherein the first document feeding means includes means for feeding respective documents of different thickness into document feeding engagement with said first movable means.

9. A document feeder adapted for use with a copier having a document illuminating station, a platen at the illuminating station and means for flash illuminating respective documents at the illuminating station, the document feeder comprising:

(a) first document feeding means for feeding respective documents to the illuminating station, said first document feeding means including a rotatable drive shaft and at least on roller mounted thereon for rotation therewith and in engagement with respective documents of different thickness fed thereto;

(b) second document feeding means for engaging and feeding respective documents from the illuminating station;

(c) third document feeding means for feeding respective documents into document feeding engagement with said at least one roller, said third document feeding means including means for detecting respective documents inserted into the document feeder, and said third document feeding means including means temporarily movable into document feeding engagement with respectively detected documents for feeding said respectively detected documents into feeding engagement with said at least one roller; and (d) said movable means including an annulus mounted on movement toward and away from respective documents inserted into said document feeder, a pulley mounted on said drive shaft for rotation therewith, and said annulus looped about said pulley for movement thereby.

10. A document feeder adapted for use with a copier having a document illuminating station, a platen at the illuminating station and means for flash illuminating respective documents at the illuminating station, the document feeder comprising:

(a) first document feeding means for feeding respective documents to the illuminating station, said first document feeding means including a rotatable drive shaft and at least one roller mounted thereon for rotation therewith and in engagement with respective documents of different thickness fed thereto;

(b) second document feeding means for engaging and feeding respective documents from the illuminating station;

(c) third document feeding means for feeding respective documents into document feeding engagement with said at least one roller, said third document feeding means including means for detecting respective documents inserted into the document feeder, and said third document feeding means including means temporarily movable into document feeding engagement with respectively detected documents for feeding said respectively detected documents into feeding engagement with said at least one roller; and (d) a white bottom wall overhanging the platen at the illuminating station of the copier, said bottom wall having a plurality of apertures formed therein, and said apertures located in the bottom wall such that only white portions of the bottom wall are illuminated when a document measuring in excess of approximately 5" along the leading edge and 6" along a side edge is fed to said illuminating station.

11. A document feeder adapted for use with a copier having a document illuminating station, a platen at the illuminating station and means for flash illuminating respective documents at the illuminating station, the document feeder comprising:

(a) first document feeding means for feeding respective documents to the illuminating station, said first document feeding means including a rotatable drive shaft and at least one roller mounted thereon for rotation therewith and in engagement with respective documents of different thickness fed thereto;

(b) second document feeding means for engaging and feeding respective documents from the illuminating station;

(c) third document feeding means for feeding respective documents into document feeding engagement with said at least one roller, said third document feeding means including means for detecting respective documents inserted into the document feeder, and said third document feeding means including means temporarily movable into document feeding engagement with respectively detected documents for feeding said respectively detected documents into feeding engagement with said at least one roller; and (d) a document retrieval platform to which respective documents are fed from the illuminating station, and an upright wedge-shaped member extending from the platform for elevating at least a portion of the respective leading edges of respective documents fed to the platform to facilitate manual removal of the respective documents from the platform.

* * * * *

UNITED STATES PATENT AND TRADEMARK OFFICE
CERTIFICATE OF CORRECTION

PATENT NO. : 4,110,038
DATED : August 29, 1978
INVENTOR(S) : Robert Irvine - Harry E. Luperti - Robert E. Manna It is certified that error appears in the above-identified patent and that said Letters Patent are hereby corrected as shown below:

Column 4, line 21, change "aand" to -- and --.

Column 5, line 32, change "docuents" to -- documents --.

Column 6, line 62, change "ro" to -- to --.

Claim 9, column 10, line 44, change "on" to -- one --.

Claim 9, column 10, line 63, change "on" to -- for --.

Signed and Sealed this

Seventeenth Day of July 1979

[SEAL]

Attest:

LUTRELLE F. PARKER
*Attesting Officer*    *Acting Commissioner of Patents and Trademarks*